United States Patent [19]
Chase

[11] Patent Number: 5,914,845
[45] Date of Patent: Jun. 22, 1999

[54] SURGE PROTECTOR SYSTEM

[76] Inventor: Ronald Cole Chase, Rte. #2 Box 252-52, Perry, Fla. 32347

[21] Appl. No.: 09/071,251

[22] Filed: May 1, 1998

[51] Int. Cl.⁶ ..................................................... H02H 3/22
[52] U.S. Cl. ............................................ 361/111; 361/91
[58] Field of Search ................. 361/54, 56, 58, 361/111, 118, 119, 91, 127

[56] References Cited

U.S. PATENT DOCUMENTS

| | | | |
|---|---|---|---|
| 4,740,859 | 4/1988 | Little | 361/56 |
| 5,010,438 | 4/1991 | Brady | 361/56 |
| 5,191,502 | 3/1993 | Epstein et al. | 361/111 |
| 5,392,188 | 2/1995 | Epstein | 361/56 |

*Primary Examiner*—Ronald W. Leja
*Attorney, Agent, or Firm*—Louis J. Brunoforte

[57] ABSTRACT

A surge protector system is provided including multiple surge protector circuits situated within a service panel of a structure. The surge protector circuits are connected between outlets of the structure and one of the surge protection devices of a power distribution network for filtering electric transients before they can reach the various outlets of the structure. This is accomplished by splitting up incoming current and voltage surges on bus bars within the service panel and directing such surges to ground.

1 Claim, 4 Drawing Sheets

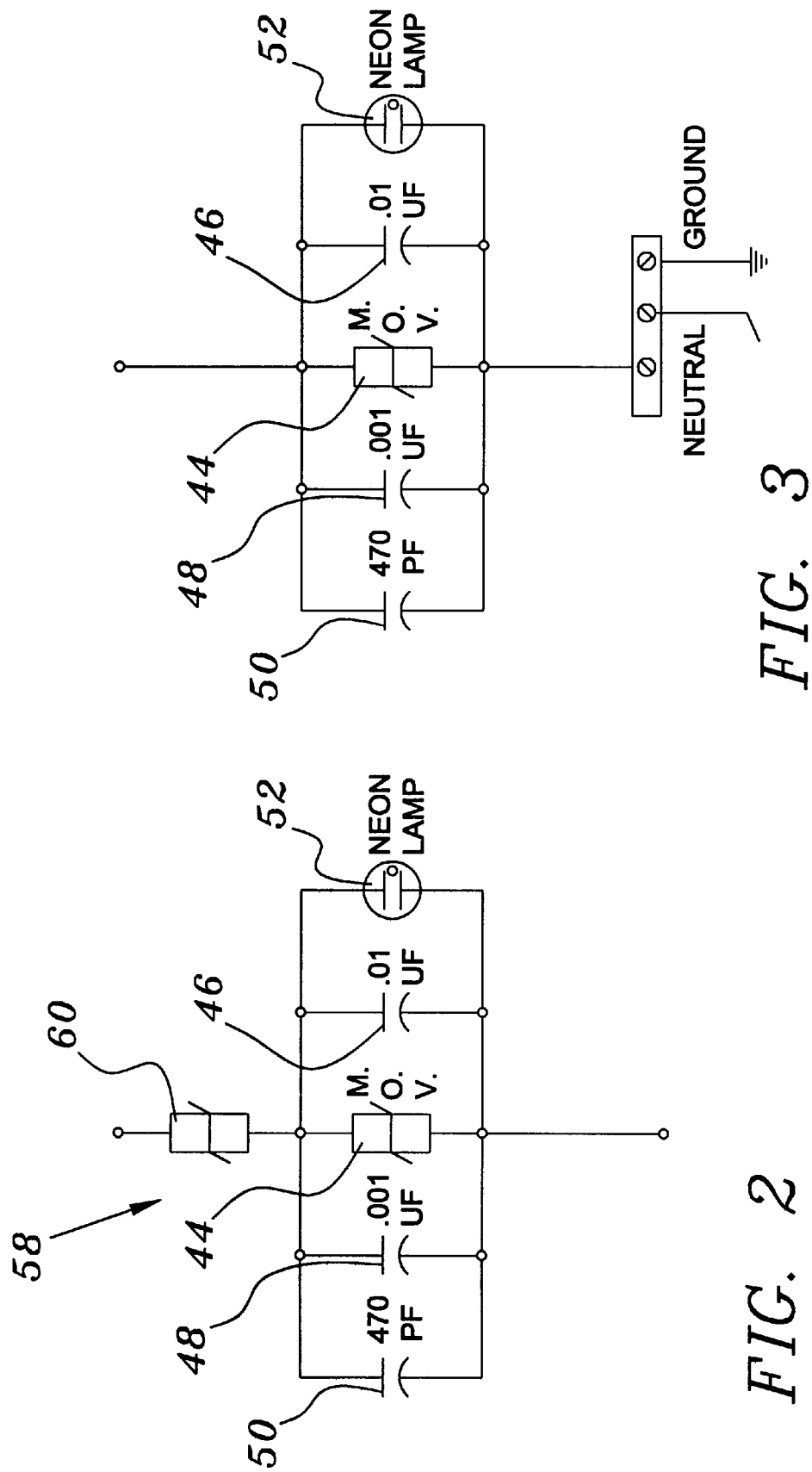

SURGE PROTECTOR SYSTEM

BACKGROUND OF THE INVENTION

1. Field of the Invention

The present invention relates to a surge protector system and more particularly pertains to protecting each power outlet of a structure from electric transients at various frequencies.

2. Description of the Prior Art

The use of surge protectors is known in the prior art. More specifically, surge protectors heretofore devised and utilized for the purpose of protecting a single outlet are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 4,739,436 to Stefani et al. which discloses a surge suppression circuit that employs metal oxide varistors configured to provide back up protection in case of failure of one of the metal oxide varistors. The circuit of the Stefani, however, fails to teach the protection of a plurality of alternating current receptacles within a structure by way of a power service panel. Further, the device of Stefani does not address any means of providing back up protection in a service panel where there is commonly two 120 VAC buses. Finally, the device of Stefani fails to address protection against electric transients at specific frequencies which commonly damage certain appliances within a home.

Further prior art patents of general interest include U.S. Pat. No. 5,032,946 to Misencik et al.; U.S. Pat. No. 5,327,319 to Lee et al.; U.S. Pat. No. 5,388,021 to Stahl; U.S. Pat. No. 5,402,100 to Urbanek et al.; U.S. Pat. No. 5,432,667 to Rau et al.; U.S. Pat. No. 5,519,564 to Carpenter, Jr.; U.S. Pat. No. 5,537,287 to Dreier; and U.S. Pat. No. 5,596,476 to Kirch et al.

In this respect, the surge protector system according to the present invention substantially departs from the conventional concepts and designs of the prior art, and in so doing provides an apparatus primarily developed for the purpose of protecting each power outlet of a structure from electric transients at various frequencies.

Therefore, it can be appreciated that there exists a continuing need for a new and improved surge protector system which can be used for protecting each power outlet of a structure from electric transients at various frequencies. In this regard, the present invention substantially fulfills this need.

SUMMARY OF THE INVENTION

In view of the foregoing disadvantages inherent in the known types of surge protectors now present in the prior art, the present invention provides an improved surge protector system. As such, the general purpose of the present invention, which will be described subsequently in greater detail, is to provide a new and improved surge protector system which has all the advantages of the prior art and none of the disadvantages.

To attain this, the present invention essentially comprises three surge protectors situated within a service panel of a structure. In turn, the service panel is connected between a power distribution network and a plurality of outlets within the structure. Each surge protector includes a metal oxide varistor for filtering electric transients of a first set of frequencies. Associated therewith is a 0.01 uF capacitor for filtering electric transients of a second set of frequencies greater than those of the first set. For filtering electric transients of a third set of frequencies greater than those of the second set, a 0.001 uF capacitor is included. Next provided is a 470 pF capacitor for filtering electric transients of a fourth set of frequencies greater than those of the third set. Also included is a neon lamp extending from the elastomeric lining. In operation, the neon lamp serves to illuminate upon the receipt of power. This indicates that the surge protector is functional. It should be understood that the neon lamp serves an additional of filtering electric transients of a fifth set of frequencies greater than those of the first set. As shown in FIG. 1, the surge protectors include a first and second surge protector each connected between one of a pair of line voltage buses of the service panel and ground. The surge protectors further include a third surge protector which is connected between the line voltage buses of the service panel.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is another object of the present invention to provide a new and improved surge protector system which may be easily and efficiently manufactured and marketed.

It is a further object of the present invention to provide a new and improved surge protector system which is of a durable and reliable construction.

An even further object of the present invention is to provide a new and improved surge protector system which is susceptible of a low cost of manufacture with regard to both materials and labor, and which accordingly is then susceptible of low prices of sale to the consuming public, thereby making such surge protector system economically available to the buying public.

Yet another object of the present invention is to protect each and every outlet of an entire structure by incorporating a surge protector within a power service panel of the structure.

Still another object of the present invention is to incorporate a system of multiple surge protectors within a power service panel for affording complete protection of a structure with optimal integrity.

Still yet another object of the present invention is to provide a surge protector which employs an functional indicator lamp which operates with alternating current.

Another object of the present invention is to provide a surge protector which employs an indicator lamp that serves not only as a means of indicating that the present invention is functional, but also for filtering electrical transients.

Lastly, it is an object of the present invention to provide a new and improved surge protector system including multiple surge protector circuits situated within a service panel of a structure. The surge protector circuits are connected between outlets of the structure and one of the surge protection devices of a power distribution network for filtering electric transients before they can reach the various outlets of the structure, or facility. This is accomplished by splitting up incoming current and voltage surges on bus bars within the service panel and directing such surges to ground.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a detailed schematic diagram of one of the surge protectors of the present invention.

FIG. 3 is a detailed schematic diagram of another one of the surge protectors of the present invention.

Similar reference characters refer to similar parts throughout the several views of the drawings.

DESCRIPTION OF THE PREFERRED EMBODIMENT

Figure 1:
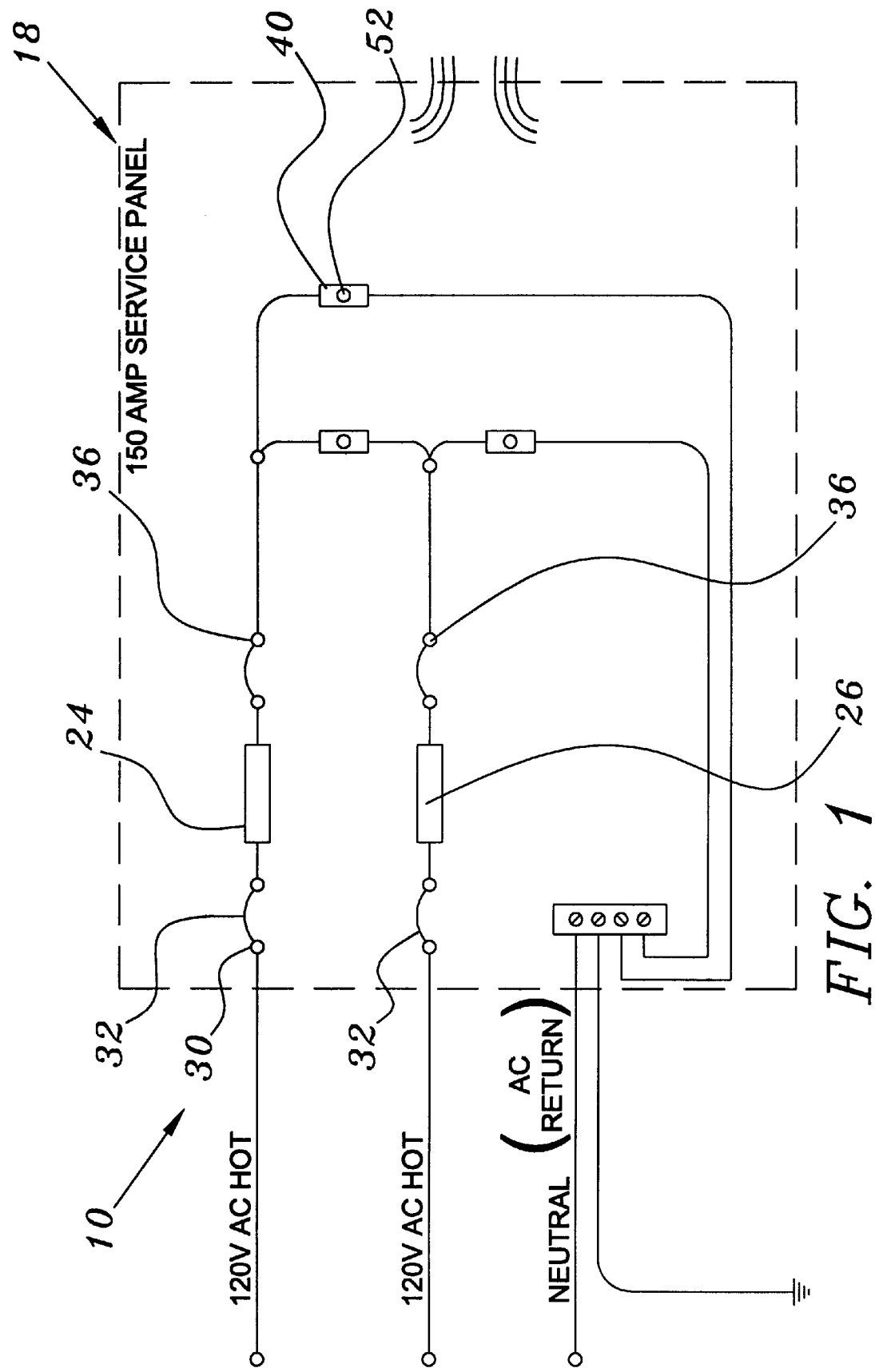
FIG. 1 is a general schematic diagram of the present invention.

With reference now to the drawings, and in particular to FIG. 1 thereof, a new and improved surge protector system embodying the principles and concepts of the present invention and generally designated by the reference numeral 10 will be described.

The present invention, the new and improved surge protector system, is comprised of a plurality of components. Such components in their broadest context include a power distribution network, a structure having a plurality of alternating current receptacles, and a surge protection means connected between the power distribution network and the alternating current receptacles. Such components are individually configured and correlated with respect to each other so as to attain the desired objective.

Figure 5:
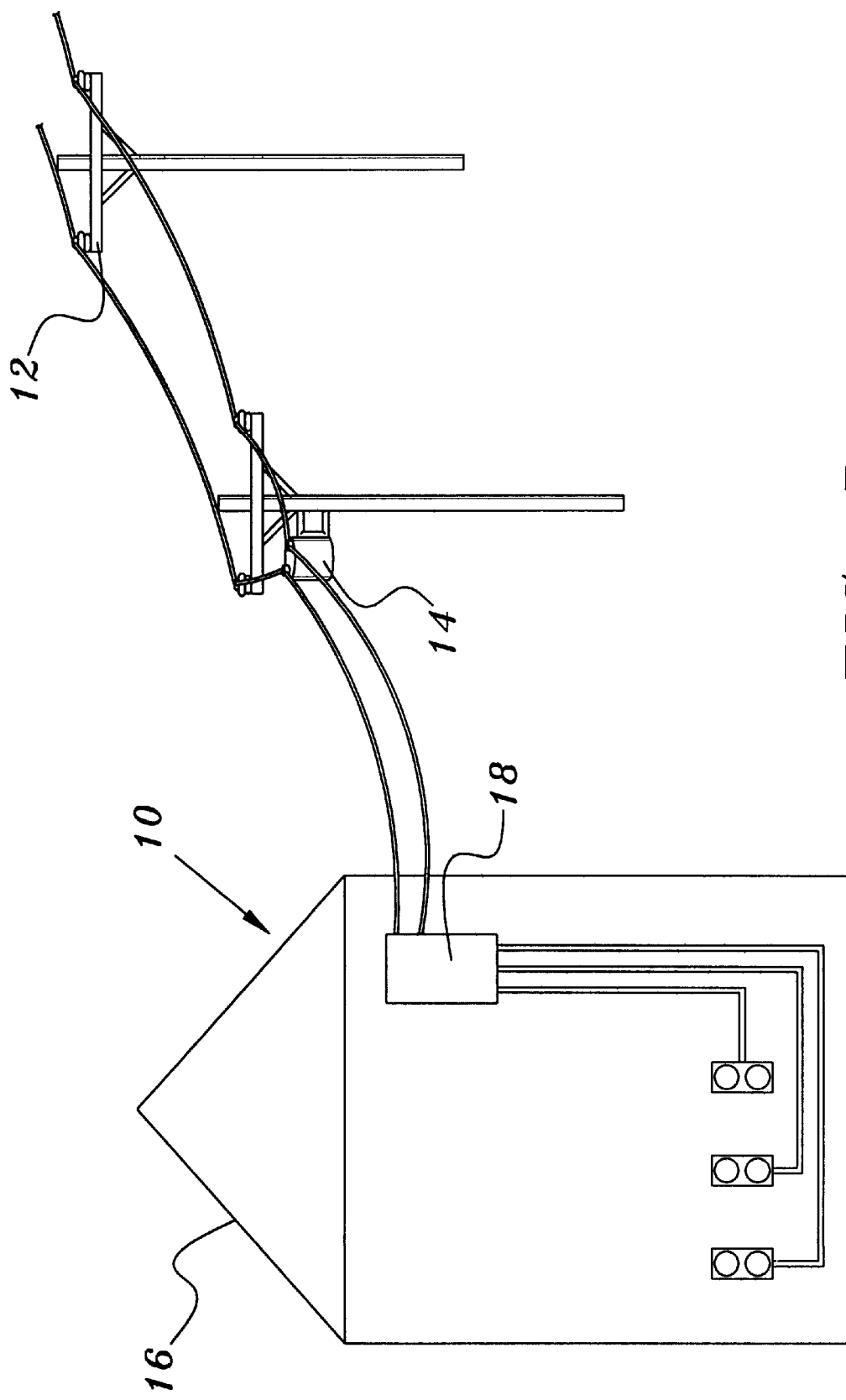
FIG. 5 is a general schematic diagram of the system of the present invention.

More specifically, it will be noted that the system 10 of the present invention includes a power distribution network 12 defined by a plurality of high voltage lines servicing many customers. As shown in FIG. 5, the power distribution network includes a plurality of surge protection devices 14 each adapted to provide a line voltage of 120 VAC at an output thereof.

With reference still to FIG. 5, a structure 16 is provided which may take the form of a residential home, school or any other type of building. The structure has a plurality of outlets 16 mounted in each of different rooms formed therein. Each outlet is adapted for releasably receiving a plug therein to provide power to an associated appliance. It should be noted that the outlets may take the form of 120 V outlets or, in the alternative, 240 V outlets for large appliances such as an electric stove or clothes dryer. The structure further includes a service panel 18 which is electrically connected between each of the outlets and the output of one of the surge protection devices of the power distribution network.

Figure 4:
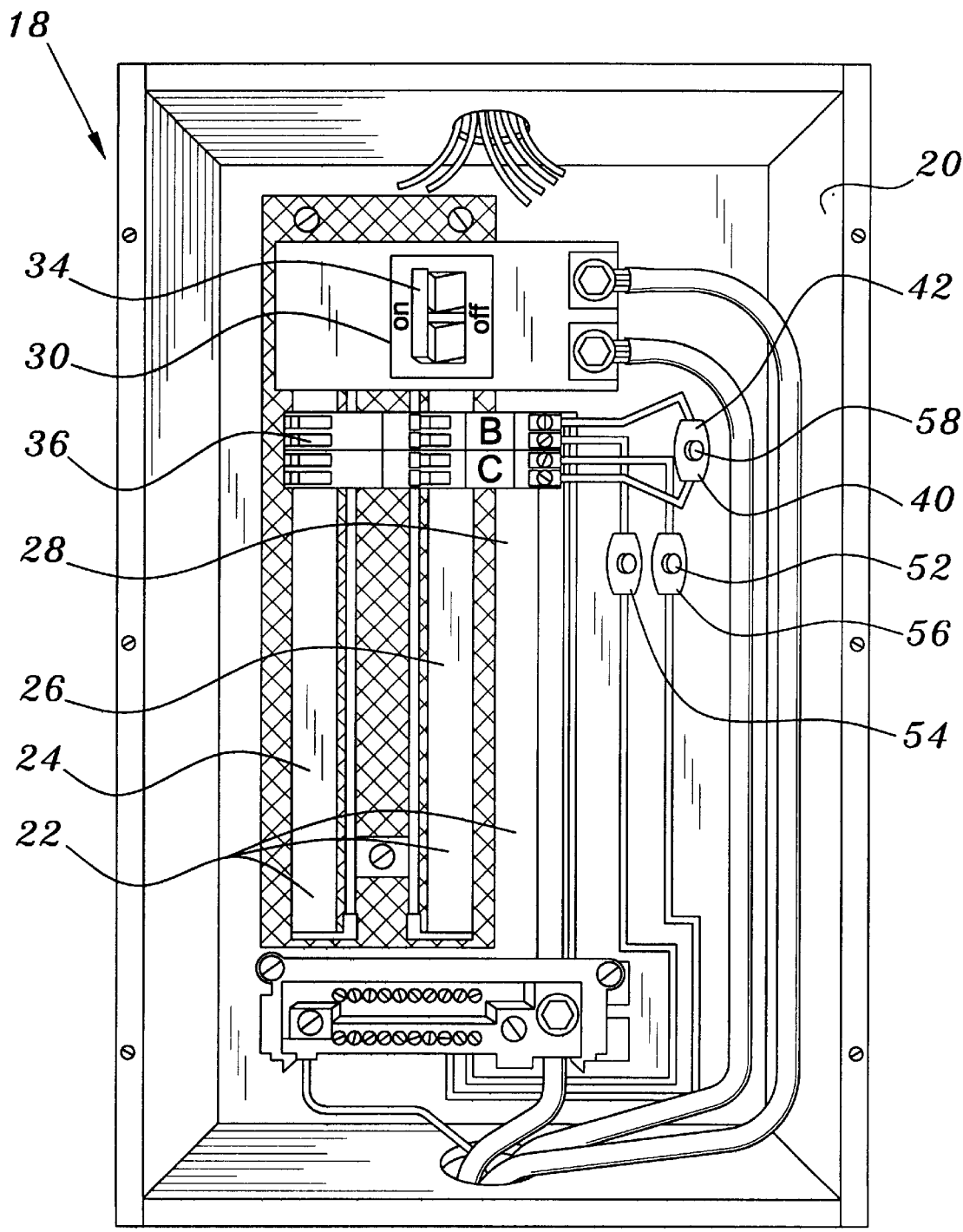
FIG. 4 is a front view of the service panel of the present invention.

As shown in FIG. 4, the service panel includes a housing 20 with a planar rectangular rear face mounted on the structure. A rectangular side wall is integrally coupled to a periphery of the rear face and extends outwardly therefrom for defining an interior space and an open front. Pivotally coupled to a front peripheral edge of the open front of the housing is a lid for selectively closing the service panel.

The service panel further includes a plurality of vertically oriented, parallel bus bars 22 mounted to the rear face of the housing within the interior space. Such bus bars include a first 120 VAC bus bar 24, a second 120 VAC bus bar 26, and a neutral bus bar 28. A 150 A primary circuit breaker 30 is situated within the service panel. As shown in FIG. 1, the primary circuit breaker has a pair of switches 32 each connected between an associated one of the 120 VAC bus bars and the outlets of the structure. The primary circuit breaker further includes a manual single toggle switch 34 adapted to open the switches coincidentally in a first orientation and close the switches coincidentally in a second orientation. Note FIG. 4.

With reference still to FIGS. 1 & 4, a pair of 10–15 A secondary circuit breakers 36 are each shown to have a switch connected between an associated one of the switches of the primary circuit breaker and the outlets of the structure. The secondary circuit breakers each includes a manual single toggle switch adapted to open the corresponding switch in a first orientation and close the corresponding switch in a second orientation. The service panel is also equipped with a wiring connector array connected between the outlets of the structure and the secondary circuit breakers. The wiring connector functions to allow convenient connection of the 120 VAC bus bars, neutral bus bar and a ground terminal 37 to the outlets.

With reference now to FIGS. 1 & 4, three discrete surge protectors 40 are situated within an associated elastomeric lining 42 and include an input node and an output node. The discrete surge protectors each further include a plurality of discrete electrical components each connected in parallel relationship with respect to each other between the input node and the output node.

FIGS. 2 & 3 show the electrical components including a metal oxide varistor 44 for filtering electric transients of a first set of frequencies. An example of an ideal metal oxide varistor for use with the present invention is that sold by RADIO SHACK under part number 276-568. Associated therewith is a 0.01 uF capacitor 46 for filtering electric transients of a second set of frequencies greater than those of the first set. For filtering electric transients of a third set of frequencies greater than those of the second set, a 0.001 uF capacitor 48 is included. Next provided is a 470 pF capacitor 50 for filtering electric transients of a fourth set of frequencies greater than those of the third set. The specific values of the capacitors of the surge protectors are critical in preventing the flow of specific current transients which damage certain appliances. For example, computers and other sensitive equipment are particularly vulnerable to electric transients of higher frequencies.

Also included is a neon lamp 52 extending from the elastomeric lining. In operation, the neon lamp serves to illuminate upon the receipt of power. This indicates that the surge protector is functional. By use of a neon lamp, no conversion to direct current is required, as with the use of light emitting diodes and the like. It should be understood that the neon lamp also serves the purpose of filtering electric transients of a fifth set of frequencies greater than those of the first set.

As shown in FIG. 4, the surge protectors include a first surge protector 54 and second surge protector 56 each having the input node and output node thereof connected between an associated one of the secondary circuit breakers and a ground terminal via the wiring connector array. The surge protectors further include a third surge protector 58 which also includes a second metal oxide varistor 60. Note FIG. 2. This additional metal oxide varistor is situated within the elastomeric lining and is connected between the input node and the switch of a first one of the secondary circuit breakers. The output node of the third surge protector is connected to the switch of a second one of the secondary circuit breakers. The inclusion of the second metal oxide varistor is critical in that it accommodates the specific voltage of the 120 VAC bus bars by splitting in half the surge entering either bus bar and directing it to ground through the first and second surge protectors.

As shown in FIG. 4, the interconnection of the surge protectors with the appropriate terminals is accomplished by wires which are connected to the appropriate nodes and extended from the elastomeric lining. These wires are ideally connected by way of screw terminals. It should be noted, however, that the surge protection circuits of the present invention may be hardwired in new homes if desired.

In use, the first and second surge protectors direct to ground any electrical transients which would normally damage appliances. The third surge protector not only functions to suppress any electrical transient differentials between the 120 VAC bus bars, but also services as a back-up surge protector in case one of the first pair of surge protectors is faulty. This is accomplished by directing a surge to ground through the surge protector that is not faulty. By the specific placement of the present invention, each outlet of the structure is rendered protected.

ALTERNATE USES

Home

There are many ways lightening can enter a home including television wiring such as an antenna or cable, telephone lines, an air conditioning unit and a well pump. In a television, one of the surge protectors can be installed from a center conductor of a 75 OHM cable to ground or in the case of a twin lead antenna wire, from each wire to ground. With regard to telephone cables in a home wherein only one phone line is used, a surge protector may be wired between a red wire of the telephone cable and ground and also between a green wire of the telephone cable and ground. If two phone lines are being used in the home, a surge protector would be connected between a black and yellow wire and ground, respectively.

A conventional compressor in a central air conditioning unit employs a large set of contacts in a large relay contactor to turn on the same. A surge protector may be wired from each of the two contact to ground to prevent arcing and contact point burn-out. A similar relay is employed in a well pump of a home. A surge protector may be wired from each of the two contacts of the well pump and ground to prevent contact point burn-out.

Automobile

In an automobile, surge protectors can be installed across an automobile start switch to ground and starting solenoid contacts to ground to prevent contact point burn-out.

Industry

Many industries use large relays in conveyor belt motor relays or to actuate a machine. Similar to the previous embodiments, surge protectors can be installed from any contact of the relay to ground for protection purposes.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved surge protector system comprising, in combination:

a power distribution network including a plurality of surge protection devices each adapted to provide a clean line voltage of 120 VAC at an output thereof;

a structure having a plurality of outlets mounted in each of different rooms formed therein, each outlet being adapted for releasably receiving a plug therein to provide power to an associated appliance, the structure further including a service panel mounted therein and electrically connected to the output of one of the surge protection devices of the power distribution network;

said service panel including a housing with a planar rectangular rear face mounted on the structure, a rectangular side wall integrally coupled to a periphery of the rear face and extending outwardly therefrom for defining an interior space and an open front, and a lid pivotally coupled to a front peripheral edge of the open front of the housing for selectively closing the service panel, the service panel further including a plurality of vertically oriented, parallel bus bars mounted to the rear face of the housing within the interior space and including a first 120 VAC bus bar, a second 120 VAC bus bar, and a neutral bus bar, the service panel also having a primary circuit breaker having a pair of switches each connected between an associated one of the 120 VAC bus bars and a plurality of outlets of the structure, the primary circuit breaker including a manual single toggle switch adapted to open the switches coincidentally in a first orientation and close the switches coincidentally in a second orientation and a pair of secondary circuit breakers each having a switch connected between an associated one of the switches of the primary circuit breaker and the outlets of the structure, the secondary circuit breakers each including a manual single toggle switch adapted to open the corresponding switch in a first orientation and close the corresponding switch in a second orientation, the service panel further including a wiring connector array connected between the outlets of the structure and the secondary circuit breakers; and three discrete surge protectors each situated within an associated elastomeric lining and including an input node and an output node, each discrete surge protector further including a plurality of discrete electrical components each connected in parallel relationship between the input node and the output node, the electrical components including:

a metal oxide varistor for filtering electric transients of a first set of frequencies, a 0.01 uF capacitor for filtering electric transients of a second set of frequencies greater than those of the first set, a 0.001 uF capacitor for filtering electric transients of a third set of frequencies greater than those of the second set, a 470 pF capacitor for filtering electric transients of a fourth set of frequencies greater than those of the third set, and a neon lamp extending from the elastomeric lining and adapted to illuminate upon the receipt of power, thereby indicating that the surge protector is functional, the neon lamp further adapted for filtering electric transients of a fifth set of frequencies greater than those of the first set;

said three discrete surge protectors including the first and the second surge protectors each having the input node and output node thereof connected between an associated one of the secondary circuit breakers and ground via the wiring connector array, the three discrete surge protectors further including the third surge protector having the input node thereof connected to the switch of a first one of the secondary circuit breakers and the output node thereof connected to the switch of a second one of the secondary circuit breakers;

wherein the third surge protector also includes a second metal oxide varistor situated within the elastomeric lining and connected between the input node of the third surge protector and the switch of the first one of the secondary circuit breakers;

wherein the third surge protector serves to suppress electrical transient differentials between the 120 VAC bus bars and further serve as a back-up surge protector.

\* \* \* \* \*